United States Patent
Ogura

(10) Patent No.: US 11,316,957 B2
(45) Date of Patent: Apr. 26, 2022

(54) DEVICE AND METHOD FOR PROCESSING DATA REQUEST TRANSMITTED FROM CLIENT

(71) Applicant: FUJITSU LIMITED, Kawasaki (JP)

(72) Inventor: Takao Ogura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/115,663

(22) Filed: Dec. 8, 2020

(65) Prior Publication Data

US 2021/0227051 A1    Jul. 22, 2021

(30) Foreign Application Priority Data

Jan. 20, 2020 (JP) .............................. JP2020-006598

(51) Int. Cl.
*H04L 29/06* (2006.01)
*H04L 67/01* (2022.01)

(52) U.S. Cl.
CPC .......... *H04L 67/42* (2013.01); *H04L 63/0807* (2013.01); *H04L 63/0884* (2013.01)

(58) Field of Classification Search
CPC . H04L 67/42; H04L 63/0807; H04L 63/0884; H04L 63/105; G06F 2221/2141; G06F 21/6245; G06F 21/33; G16H 10/60
See application file for complete search history.

(56) References Cited

U.S. PATENT DOCUMENTS 7,970,820 B1 *  6/2011  Sivasubramanian ... H04L 67/02
                                                            709/203
11,003,791 B2 *  5/2021  Wang ..................... G16B 50/40
2013/0047249 A1  2/2013  Radhakrishnan et al.
2015/0058950 A1  2/2015  Miu
2019/0237169 A1 *  8/2019  Culver ............... G06Q 30/0207

FOREIGN PATENT DOCUMENTS

CN    110505198         11/2019
EP     3070662 A1        9/2016
JP    2018-173917 A     11/2018
JP    2019-070921 A      5/2019

OTHER PUBLICATIONS

EESR—Extended European Search Report of European Patent Application No. 20210017.8 dated Apr. 22, 2021.

* cited by examiner

*Primary Examiner* — Joe Chacko
(74) *Attorney, Agent, or Firm* — Fujitsu Patent Center

(57) ABSTRACT

A server device includes: a receiver and a processor. The receiver receives a data request transmitted, from a client device via a resource server. The data request includes attribute information, a data item and a quality request. The processor transmits, to the client device, a first token for requesting quality information indicating a quality of personal data corresponding to the attribute information and the data item and a second token for requesting the personal data. The processor transmits, to the resource server, identification information of a data owner who has consented to providing personal data pertaining to the data item and corresponds to the attribute information when the server device receives the first token from the resource server. The processor transmits a verification result for the second token to the resource server when the server device receives the second token from the resource server.

9 Claims, 15 Drawing Sheets

| ID:2134 | ... | 2019/07/02 | 2019/07/03 | 2019/07/04 | ... |
|---|---|---|---|---|---|
| WEIGHT | | 64.2 | – | 64.5 | |
| BLOOD PRESSURE | | 123/81 | 130/90 | 125/88 | |
| NUMBER OF STEPS | | 2345 | 16021 | 8073 | |
| ⋮ | | | | | |

F I G. 3

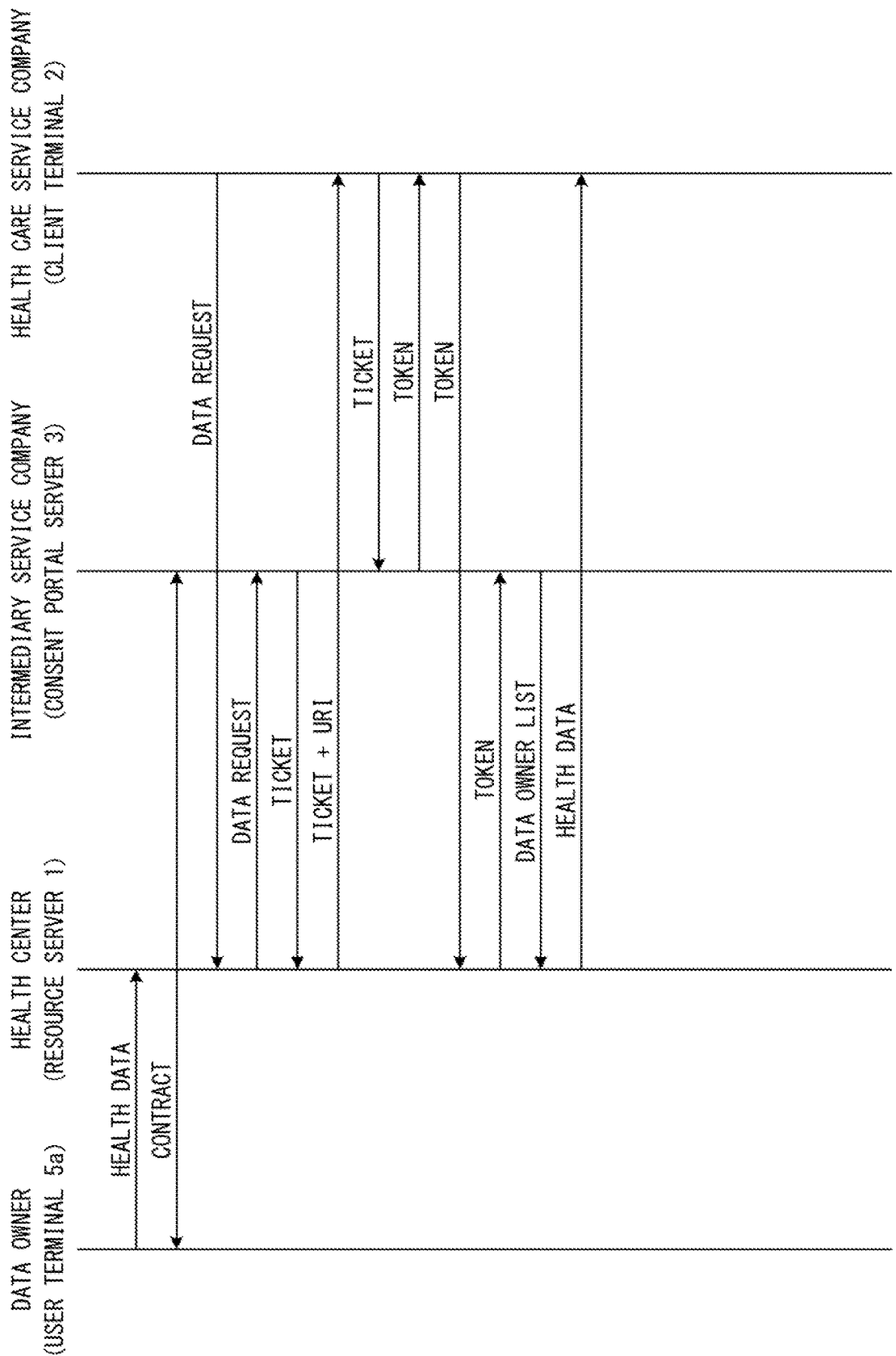
F I G. 4

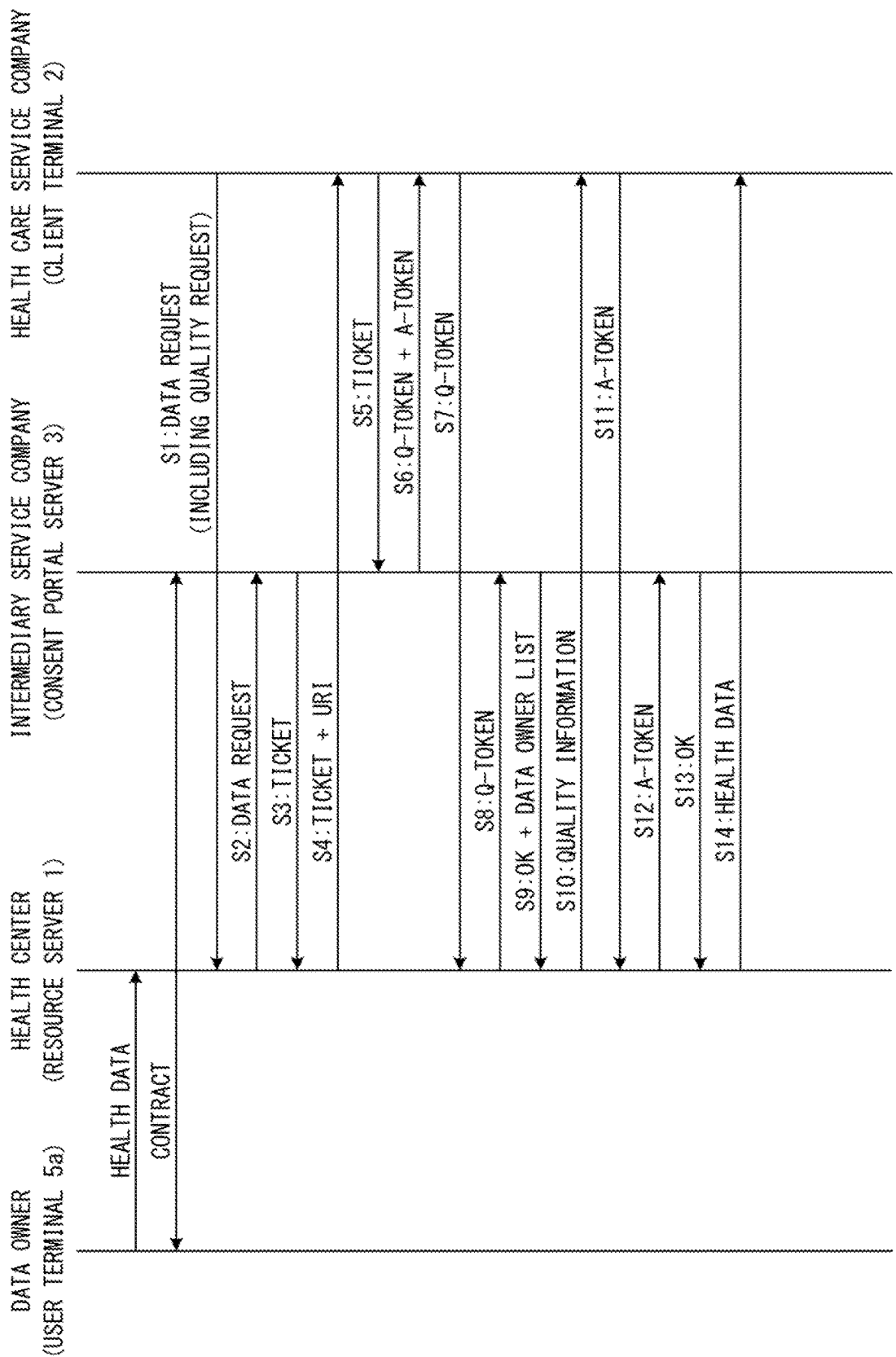
F I G. 5

FIG. 7A

<RESOURCE MANAGEMENT TABLE>

| RESOURCE MANAGEMENT ID | DATA PROVIDER | DATA NAME | DATA ITEMS |
|---|---|---|---|
| RM_001 | HEALTH CENTER | HEALTH DATA | WEIGHT, BLOOD PRESSURE, STEP COUNT, ... |
| | | | |

FIG. 7B

<DATA-OWNER MANAGEMENT TABLE>

| NAME | ADDRESS | SEX | DATE OF BIRTH | PSEUDONYM ID | RESOURCE ID | POLICY | CONSENT |
|---|---|---|---|---|---|---|---|
| YAMADA xx | KANAGAWA ... | MALE | 2000/04/12 | 2134 | R_2134 | — | OK |
| SUZUKI yy | TOKYO ... | FEMALE | 1967/05/22 | 2135 | R_2135 | — | OK |
| | | | | | | | |

FIG. 7C

<REQUEST MANAGEMENT TABLE>

| REQUEST ID | SOURCE | DETAILS OF REQUEST | Q-TOKEN | A-TOKEN |
|---|---|---|---|---|
| RQ_001 | HEALTH CARE SERVICE COMPANY | AGE RANGE & SEX & (WEIGHT & BLOOD PRESSURE & STEP COUNT) | token_Q1 | token_A1 |
| | | | | |

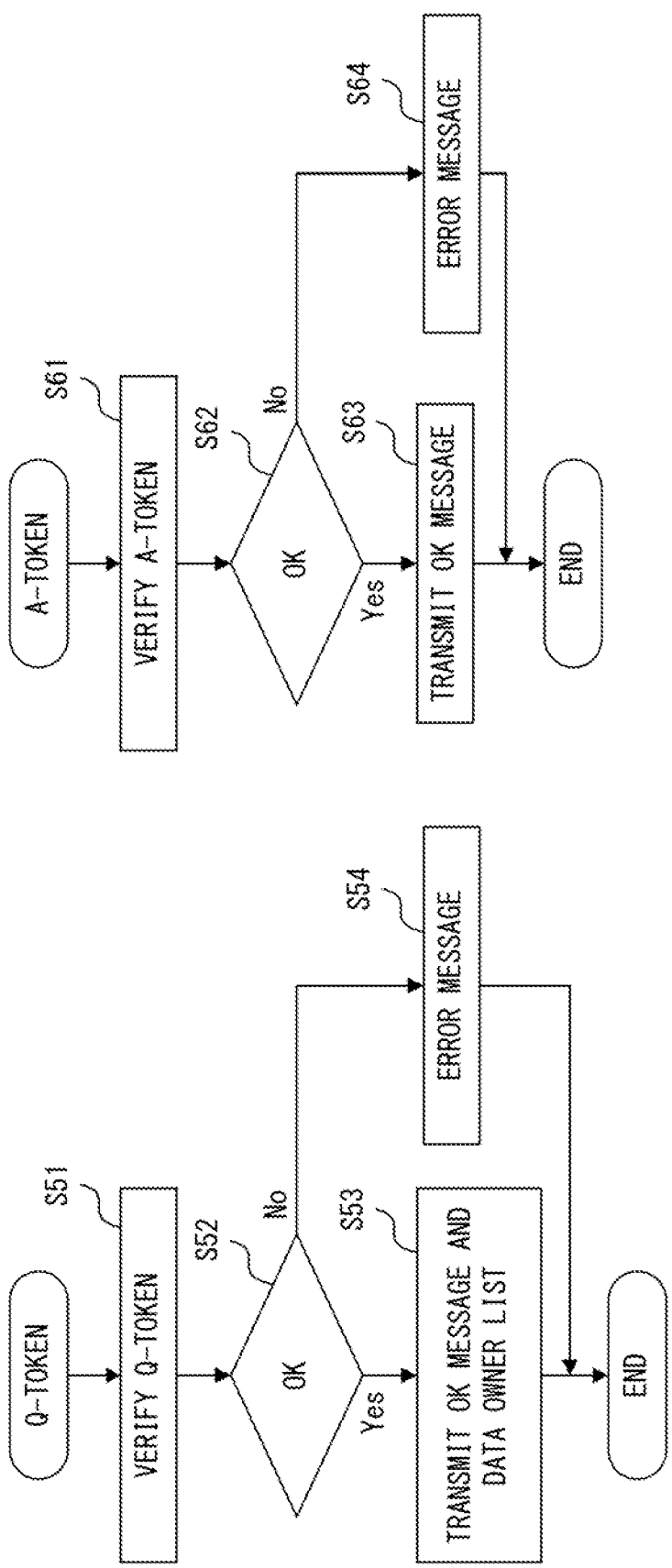

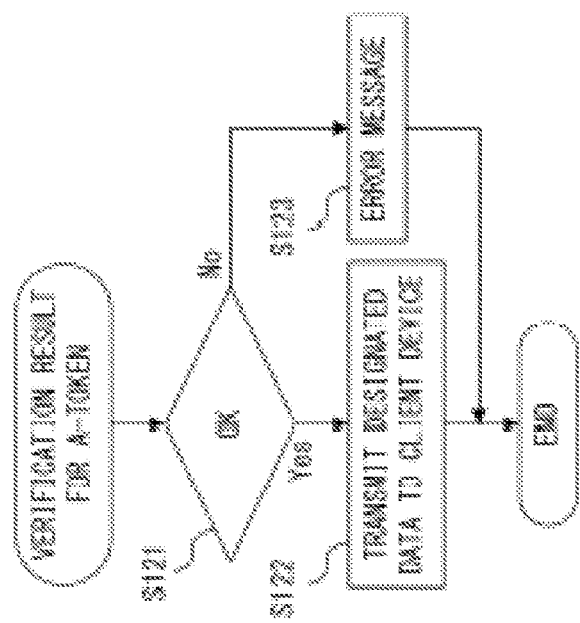
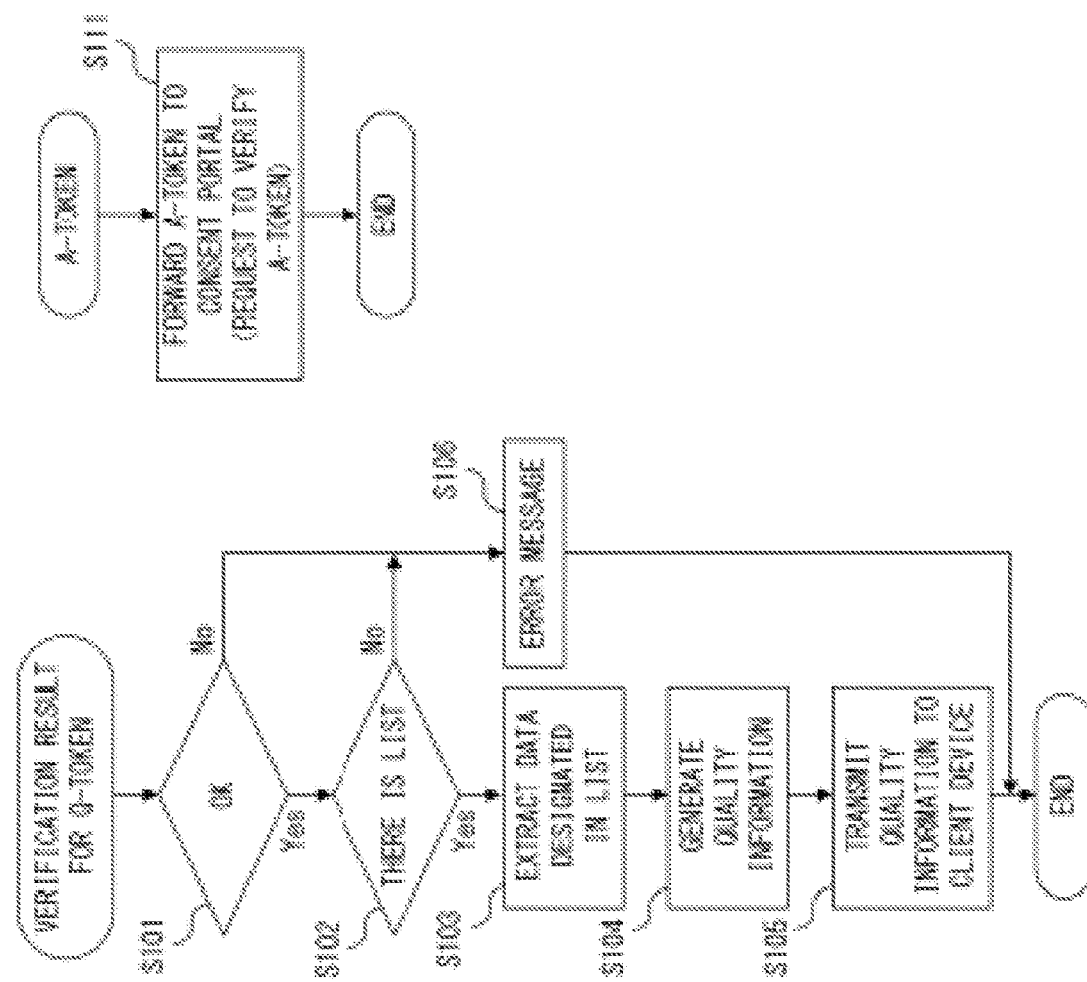
FIG. 14A  FIG. 14B  FIG. 14C

DEVICE AND METHOD FOR PROCESSING DATA REQUEST TRANSMITTED FROM CLIENT

CROSS-REFERENCE TO RELATED APPLICATION

This application is based upon and claims the benefit of priority of the prior Japanese Patent Application No. 2020-006598, filed on Jan. 20, 2020, the entire contents of which are incorporated herein by reference.

FIELD

The embodiments discussed herein are related to a device and a method for processing a data request transmitted from a client.

BACKGROUND

In recent years, services such as personal data stores (PDSs) and information banks have attracted attention for using personal data. A PDS/information bank provides a third party (i.e., a data user) with personal data entrusted thereto by a user. However, a user's consent may be required to provide the user's personal data to the data user. Accordingly, proposed methods are ones Wherein when distributing personal data, consent is acquired from the user (i.e., the owner of the personal data). For example, OAuth2.0 and UMA2.0 are widely known. Relevant techniques are described in, for example, Japanese Laid-open Patent Publication No. 2018-173917 and Japanese Laid-open Patent Publication No. 2019-070921.

In many cases, qualities vary considerably among personal data. Thus, a data user could acquire low-quality personal data. For example, data may be partly lost. Alternatively, data may include an incorrect value (or a value that cannot be true). When the quality of acquired personal data is low, the data user cannot utilize the personal data sufficiently.

SUMMARY

According to an aspect of the embodiments, a server device includes: a receiver configured to receive a data request transmitted from a client device via a resource server, the data request including attribute information, a data item and a quality request; and a processor configured to transmit, to the client device, a first token for requesting quality information indicating a quality of personal data corresponding to the attribute information and the data item and a second token for requesting the personal data, transmit, to the resource server, identification information of a data owner who has consented to providing personal data pertaining to the data, item and corresponds to the attribute information when the server device receives the first token from the resource server, and transmit a verification result for the second token to the resource server when the server device receives the second token from the resource server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates examples of personal data stored in a resource server;

FIG. 4 illustrates an example of a sequence of acquiring personal data from a resource server;

FIG. 5 illustrates an example of a sequence for a data processing method in accordance with embodiments of the invention;

FIGS. 7A-7C illustrate examples of tables managed by a consent portal server;

FIGS. 10A, 10B, 11, 12A, and 13B are flowcharts illustrating examples of processes performed by a consent portal server;

FIGS. 13A-13C and 14A-14C are flowcharts illustrating examples of processes performed by a resource server.

DESCRIPTION OF EMBODIMENTS

Figure 1:
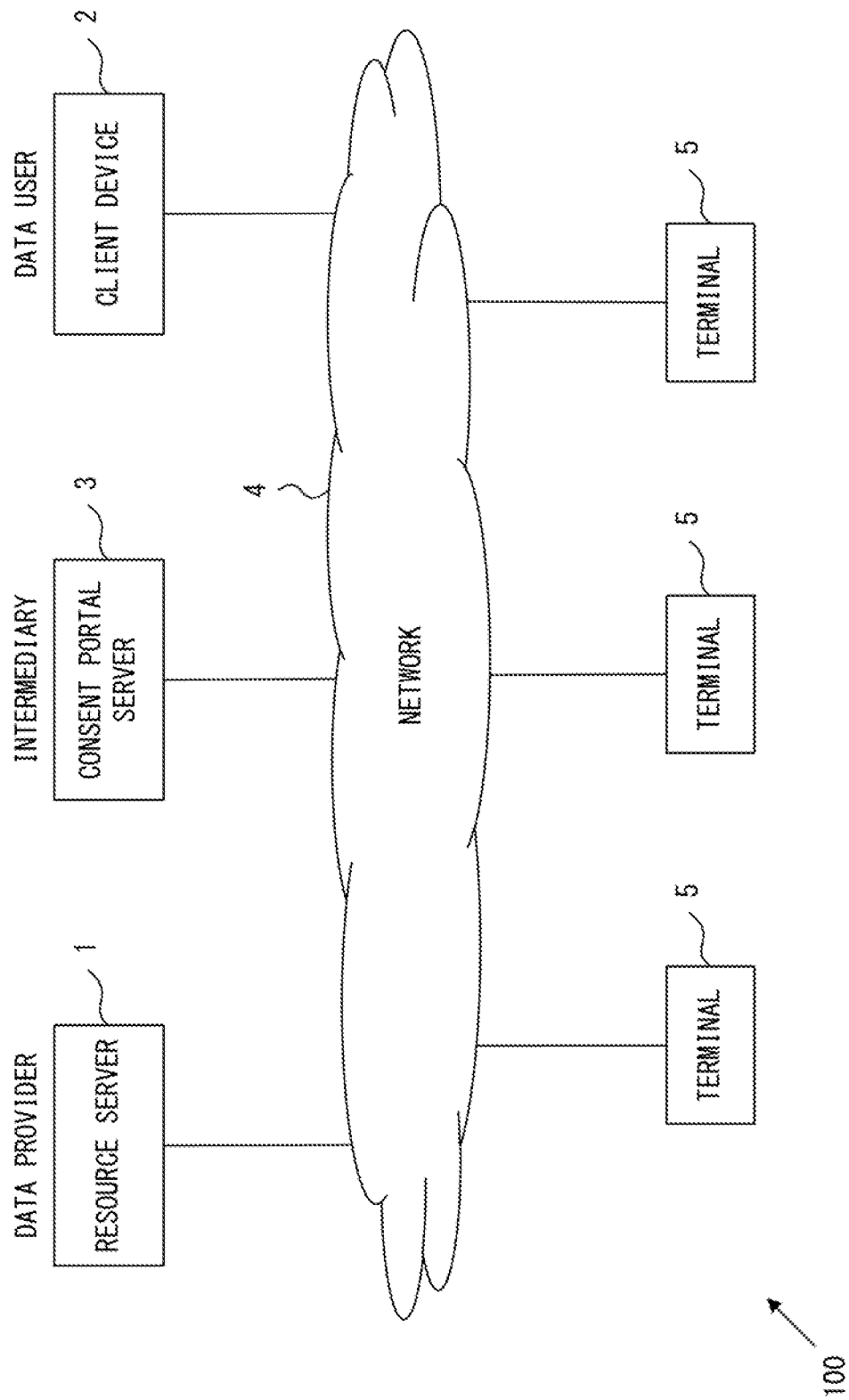
FIG. 1 illustrates an example of a data processing system in accordance with embodiments of the invention.

FIG. 1 illustrates an example of a data processing system in accordance with embodiments of the invention. A data processing system 100 in accordance with embodiments of the invention includes a resource server 1, a client device 2, and a consent portal server 3. The resource server 1, the client device 2, and the consent portal server 3 are connected to a network 4. For example, the network 4 may be, but is not particularly limited to, the Internet.

The resource server (data provider) 1 stores personal data. In this example, personal data is received from a terminal 5. The client device (data user) 2 acquires personal data stored in the resource server 1. The consent portal server 3 serves as an intermediary for providing personal data from the resource server 1 to the client device 2. The consent portal server 3 acquires the consent of the owner of the personal data stored in the resource server 1 for providing the personal data to a third party. Note that the owner of personal data may hereinafter be referred to as a "data owner (or resource owner)".

Figure 2:
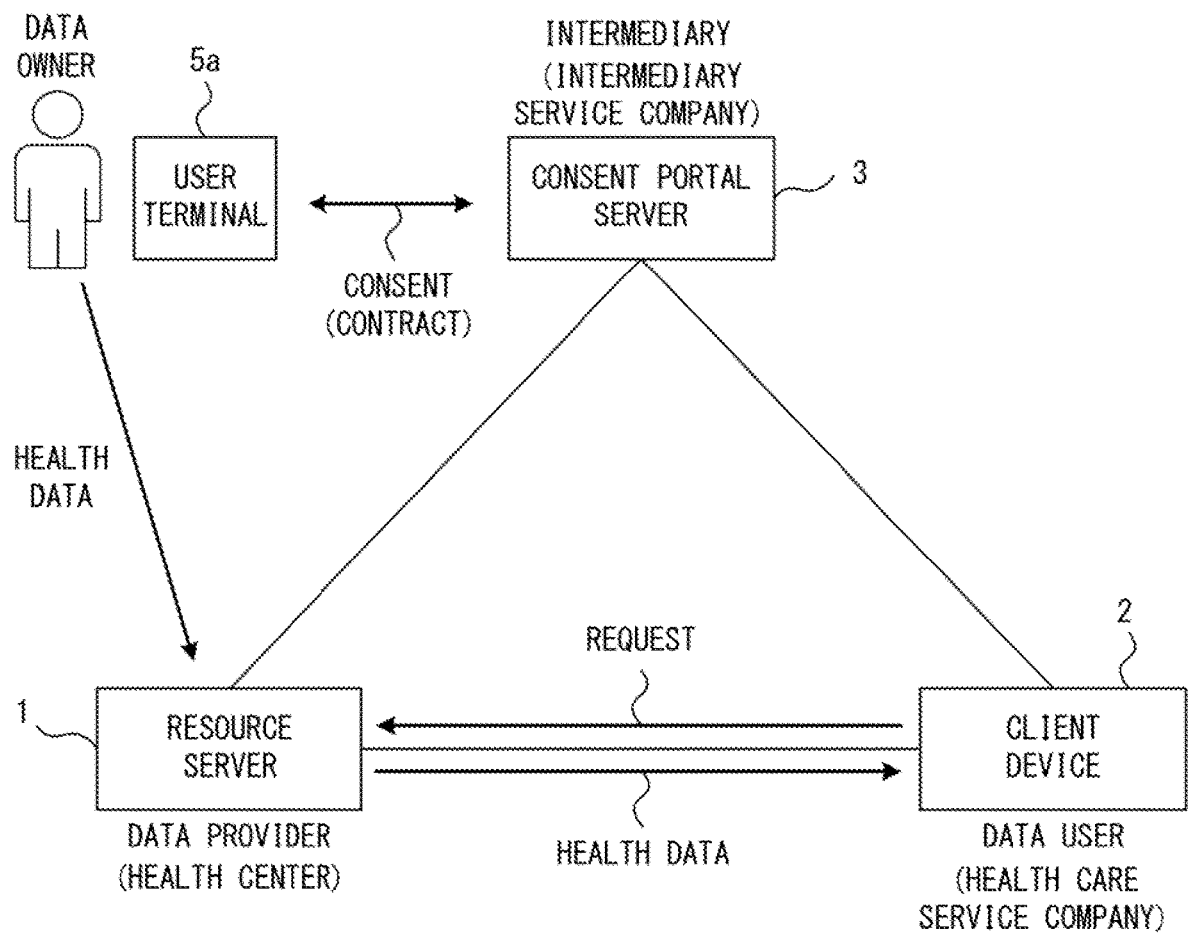
FIG. 2 illustrates an example of an operation of a data processing system.

FIG. 2 illustrates an example of an operation of the data processing system 100. In this example, the resource server 1 is provided in a health center. The client device 2 is provided for a health care service company that provides health care services.

The health center collects health data of data owners. Thus, the data owners provide their health data to the health center. Health data is an example of personal data and, in this example, includes the weight, blood pressure, step count, sleep time, and the like of a data owner, as indicated in FIG. 3. In particular, a data owner measures his/her weight, blood pressure, step count, sleep time, and the like as health data every day. The data owner transmits the measured health data to the resource server 1 by using, for example, a user terminal 5a. As a result, the health data of the data owner is accumulated in the resource server 1. Although, personal data of one data owner is stored in the resource server 1 in the example depicted in FIGS. 2-3, personal data of many data owners is actually accumulated in the resource server 1.

The health care service company generates health service information for health improvement by analyzing health data of many data owners. For example, heath service information may be sent to a data owner who provided heath data. The health care service company may sell health service information according to the consent of the data owner. For example, the health care service company may sell health service information to a hospital or a doctor. In this way, the health care service company acquires health data from the health center and generates health service information using the acquired health data.

The consent portal server 3 is an example of an authorization server and, in this example, is provided for an intermediary service company that serves as an intermediary for distribution of personal data. When a data owner provides his/her health data to the health center, the intermediary service company acquires the consent of the data owner for providing the health data to a third party. In this case, the data owner transmits attribute information to the consent portal server 3 by using for example, the user terminal 5a. Attribute information includes the name, address, sex, date of birth (or age), and the like of the data owner. For each data owner, the consent portal server 3 manages the presence/absence of consent for providing health data to a third party in association with attribute information of the data owner.

FIG. 4 illustrates an example of a sequence of acquiring personal data from the resource server 1. In this example, health data of many data owners is stored in the resource server 1. The client device 2 acquires health data stored in the resource server 1.

A data owner provides his/her health data to the health center. In particular, the health data of the data owner is transmitted from the user terminal 5a to the resource server 1. Then, the health data of the data owner is stored in the resource server 1. For example, the user terminal 5a may be a smartphone, a tablet, or a personal computer.

The data owner contracts with the intermediary service company regarding use of his/her health data. In this example, the data owner contracts with the intermediary service company when the data owner receives services from the health care service company. Assume that the data owner consents that his/her health data is used by the third party (health care service company). At this time, the intermediary service company acquires the consent of the data owner as a proxy for the health care service company.

The data owner can indicate an access control policy for the contract with the intermediary service company. For example, the data owner may indicate an access control policy wherein a portion of the health data (e.g., weight) is not allowed to be provided to the third party.

The contract between the data owner and the intermediary service company is made by means of the user terminal 5a and the consent portal server 3. In this case, for example, an input form provided from the consent portal server 3 may be displayed on a display device of the user terminal 5a. The data owner inputs needed information by using the input form. As a result, information indicating the consent for the health data being provided to the third party is stored in the consent portal server 3 in association with the attribute information of the data owner.

When needing to acquire health data accumulated in the health center, the health care service company makes a request for the health center to provide the desired data thereto. In this case, a data request is transmitted from the client device 2 to the resource server 1. In this example, the data request designates attribute information and data items. The attribute information designates attributes of data owners. For example, attribute information may designate age range and sex. The data items designate items of data needed by the health care service company. The following is an example of a data request.

(1) Age Range: 50-59
(2) Sex: Male
(3a) Weight
(3b) Blood Pressure
(3d) Step count For example, the details of a data request may be designated using a URI. The resource server 1 can identify the requested data according to the URI.

The resource server 1 forwards the data request received from the client device 2 to the consent portal server 3. Then, the consent portal server 3 retains the data request received from the resource server 1 and issues a ticket for allowing for access to the consent portal server 3. For example, this ticket may be one used under UMA2.0. The consent portal server 3 transmits the ticket to the resource server 1.

The resource server 1 transmits the ticket issued by the consent portal server 3 to the client device 2. In this case, the resource server 1 reports, to the client device 2, a URI for allowing for access to the consent portal server 3.

The client device 2 transmits the ticket received from the resource server 1 to the consent portal server 3. In this case, the client device 2 accesses the consent portal server 3 by using the URI reported by the resource server 1.

The consent portal server 3 decides whether the ticket received from the client device 2 has been authorized. In this case, when the ticket received from the client device 2 matches the ticket issued by the consent portal server 3, it is decided chat the ticket received from the client device 2 has been authorized. When the authorized ticket is received from the client device 2, the consent portal server 3 issues a token. The token allows the health data to be acquired from the resource server 1. The consent portal server 3 transmits the token to the client device 2.

The client device 2 transmits the toked issued by the consent portal server 3 to the resource server 1. Then, the resource server 1 transmits the token received from the client device 2 to the consent portal server 3 so as to check whether the token is valid.

The consent portal server 3 decides whether the token received from the resource server 1 is valid. In this case, when the token received from the resource server 1 matches the token issued by the consent portal server 3, it is decided that the token received from the resource server 1 is valid. When the received token is valid, the consent portal server 3 generates a data owner list based on the data request transmitted from the client device 2.

The data owner list includes identification information of data owners who satisfy the following two requirements.
(1) Consent to providing personal data pertaining to data items included in the data request transmitted from the client device 2.
(2) Correspond to the attribute information included in the data request transmitted from the client device 2.

For each data owner, information indicating whether the data owner has consented to providing personal data is stored in a database for the consent portal server 3. The intermediary service company acquires attribute information of data owners who have made a contract with respect to providing health data. Thus, the consent portal server 3 retains attribute information of the data owners. Accordingly, the consent portal server 3 can specify data owners who satisfy the two requirements. In the example described above, data owners who correspond to "Age: 50-59" and "Sex: Male" are specified among the data owners who have consented to providing health data. The consent portal server 3 generates a data owner list that includes identification information indicating the specified data owners.

The consent portal server 3 transmits the generated data owner list to the resource server 1. In this case, the consent portal server 3 may report data items to be extracted from the database to the resource server 1. Note that the data items to be extracted from the database are designated in the data request transmitted from the client device 2. In the example described above, the consent portal server 3 reports "weight, blood pressure, step count" to the resource server 1 as data items to be extracted.

In accordance with the data owner list and the data items received from the consent portal server 3, the resource server 1 extracts health data of data owners corresponding to the attributes needed by the health care service company from the database for the resource server 1. In the example described above, health data of data owners corresponding to "Age: 50-59" and "Sex: Male" is extracted, and weight data, blood pressure data, and step count data are extracted from the health data. The resource server 1 transmits the extracted health data to the client device 2. As a result, the health care service company acquires needed personal data.

As described above, in the sequence depicted in FIG. 4, the intermediary service company collectively acquires the consents of data owners as a proxy for the health care service company. Thus, the health care service company can acquire many pieces of health data without performing the task of acquiring the consents of data owners. Note that the sequence depicted in FIG. 4 is based on UMA2.0.

However, personal data could be incomplete. For example, health data may be generated by a data owner himself/herself performing measurements. Hence, if the data owner forgets to perform a measurement, the data will be partly lost. In the example depicted in FIG. 3, weight data is lost for Jul. 3, 2019. Meanwhile, the data owner could enter an incorrect value when inputting measurement data to the user terminal 5*a*. For example, "645 kg" could be input as weight data which should be "64.5 kg". The health care service company cannot perform an effective analysis when health data is incomplete.

As described above, the quality of personal data acquired from the resource server 1 could be low in a personal data transaction. A personal data transaction is difficult to develop when low-quality personal data, is provided. Accordingly, a data processing method in accordance with embodiments of the present invention is provided with a function for providing information indicating the quality of personal data. In particular, in the data processing method in accordance with embodiments of the present invention, the data user can check the quality of personal data before acquiring the personal data from the resource server 1.

EMBODIMENTS

FIG. 5 illustrates an example of a sequence for a data processing method in accordance with embodiments of the invention. In this example, health data of many data owners is stored in the resource server 1, as in the case depicted in FIG. 4. The contract between the data owner and the intermediary service company in FIG. 5 is substantially the same as that in FIG. 4.

FIGS. 4 and 5 are substantially the same in terms of the procedure from the process in which the client device 2 transmits a data request to the resource server 1 to the process in which the client device 2 transmits a ticket to the consent portal server 3 (S1-S5 in FIG. 5). However, the data request transmitted from the client device 2 in embodiments of the invention includes a quality request, as depicted in FIG. 5. The quality request requests information indicating the quality of personal data that the client device 2 is to acquire from the resource server 1.

For example, a data request that includes a quality request may be indicated using a URI. In this case, the URI indicating the data request includes the following path information.
/operation/quality/pseudonymID_gender__ageRange_ (weight__bloodPressure_steps)
The "quality" makes a request to generate information indicating the equality of personal data. The "pseudonymID" requests a pseudonym of the data owner, not the true name. The "gender" and the "ageRange" are examples of attribute information and indicate "sex" and "age (or range of age)". The "weight_bloodPressure_steps" are examples of data items and indicate "weight", "blood pressure", and "step count".

Details of a data request may be represented by a query (?) as follows.
/operation/quality?pseudonymID_gender__ageRange_ (weight__bloodPressure_steps)

When receiving a ticket transmitted from the client device 2 in S5, the consent portal server 3 decides whether this ticket has been authorized. When an authorized ticket is received from the client device 2, the consent portal server 3 issues a Q-token and an A-token. The Q-token requests quality information indicating the quality of personal data corresponding to the attribute information and data items included in the data request transmitted from the client device 2. As with the token used in the sequence depicted in FIG. 4, the A-token requests personal data corresponding to the attribute information and data items included in the data request transmitted from the client device 2. In S6, the consent portal server 3 transmits the Q-token and the A-token to the client device 2.

In S7, the client device 2 transmits the Q-token issued by the consent portal server 3 to the resource server 1. Then, in S8, the resource server 1 forwards the Q-token received from the client device 2 to the consent portal server 3 so as to check whether the Q-token is valid.

The consent portal server 3 decides whether the Q-token received from the resource server 1 is valid. In this case, when the Q-token received from the resource server 1 matches the Q-token issued by the consent portal server 3, it is decided that the Q-token received from the resource server 1 is valid. When the received Q-token is valid, the consent portal server 3 generates a data owner list based on the data request transmitted from the client device 2.

A method for generating the data owner list is substantially the same as the method described above by referring to FIG. 4. In particular, data owners corresponding to the attribute information included in the data request transmitted from the client device 2 are specified among the data owners who have consented to providing health data. The consent portal server 3 creates a data owner list that includes identification information indicating the specified data owners. In S9, the data owner list is transmitted from the consent portal server 3 to the resource server 1.

According to the data request received from the client device 2 in S1 and the data owner list received from the consent portal server 3 in S9, the resource server 1 extracts health data of data owners corresponding to attributes needed by the health care service company from the database for the resource server 1. In the example described above, health data of data owners corresponding to "Age: 50-59" and "Sex: Male" is extracted, and "weight data, blood pressure data, and step count data" are extracted from the extracted health data.

However, the resource server 1 receives the Q-token from the client device 2 in S7. Thus, the resource server 1 generates quality information indicating the quality of the health data extracted in the manner described above. The resource server 1 transmits the quality information to the client device 2 in S10. A method for generating the quality information will be described hereinafter in detail.

The health care service company acquires the quality information transmitted from the resource server 1. The quality information indicates the quality of personal data that the health care service company is to acquire. Thus, the health care service company can evaluate the value of personal data provided by the resource server 1.

In this example, the health care service company decides to acquire personal data from the resource server 1 after analyzing the quality information acquired using the Q-token. In this case, the A-token is transmitted from the client device 2 to the resource server 1 in S11. Note that, as described above, the A-token requests the personal data corresponding to the attribute information and data items included in the data request transmitted from the client device 2.

In S12, the resource server 1 forwards the A-token received from the client device 2 to the consent portal server 3 so as to check whether the A-token is valid. The consent portal server 3 verifies whether the A-token received from the resource server 1 is valid. In this case, when the A-token received from the resource, server 1 matches the A-token issued by the consent portal server 3, it is decided that the A-token received from the resource server 1 is valid. In S13, the consent portal server 3 transmits the verification result to the resource server 1.

The resource server 1 receives the verification result for the A-token from the consent portal server 3. In this example, the A-token is valid. Accordingly, the resource server 1 transmits the health data designated by the data request to the client device 2. As a result, the health care service company acquires needed personal data.

As described above, in the data processing method in accordance with embodiments of the invention, the intermediary service company collectively acquires the consents of data owners as a proxy for the health care service company. Thus, the health care service company can acquire many pieces of health data without performing the task of acquiring the consents of data owners. In addition, the health care service company can check the quality of personal data before actually acquiring the personal data. Hence, the health care service company can acquire valuable personal data of high quality. In other words, the health care service company can avoid purchasing low-quality personal data. Note that a part of the sequence depicted in FIG. 5 is also based on UMA2.0.

Next, descriptions are given of a method for generating quality information. In this example, quality information is generated according to ISO25012. Thus, quality information pertaining to currentness, completeness, accuracy, consistency, and credibility is generated for personal data. In addition, quality information pertaining to data volume and dispersibility is also generated.

(1) Data Volume

A data volume indicates the amount of data with which statistical processing can be performed. In particular, the data volume indicates the number of samples in a parent population. When, for example, performing analysis by sex/age in a market; research with 500 samples, 30 or more samples are considered to be needed for each attribute.

(2) Dispersibility

A dispersibility indicates whether data is distributed evenly or unevenly. For example, it may be decided that data is distributed evenly when the numbers of samples falling within the age ranges from teens to 60 s are approximately equal.

(3) Currentness

A currentness indicates whether data is new. For example, it may be decided that the currentness is high for health data measured in the past year.

(4) Accuracy

An accuracy indicates whether data is correct. The accuracy also indicates whether data is represented in a designated format. For example, it may be decided that the accuracy is low for a blood-pressure value of "1000", i.e., a value that cannot be true. When a slash "/" should be interposed between a minimal blood pressure and a maximal blood pressure, it will be decided that the accuracy is low if a comma "," is interposed between the two values.

(5) Completeness

A completeness indicates whether related data is lost. In the example depicted in FIG. 3, the weight data for Jul. 3, 2019 is lost.

(6) Consistency

A consistency indicates the presence/absence of a logical contradiction. For example, it may be decided that the consistency is lacked if "Jan. 1, 2005" is indicated in a column of data of birth while "20 years old" is indicated in a column of age.

(7) Credibility

A credibility indicates whether contents of data are reliable in terms of a method for collection or verification of the data. For example, it may be decided that the credibility is high when information identifying a data owner is the driver's license or the passport.

When receiving a Q-token, the resource server 1 generates quality information associated with designated personal data for one or more of the seven evaluation items described above. The resource server 1 transmits the generated quality information to the client device 2.

Figure 6:
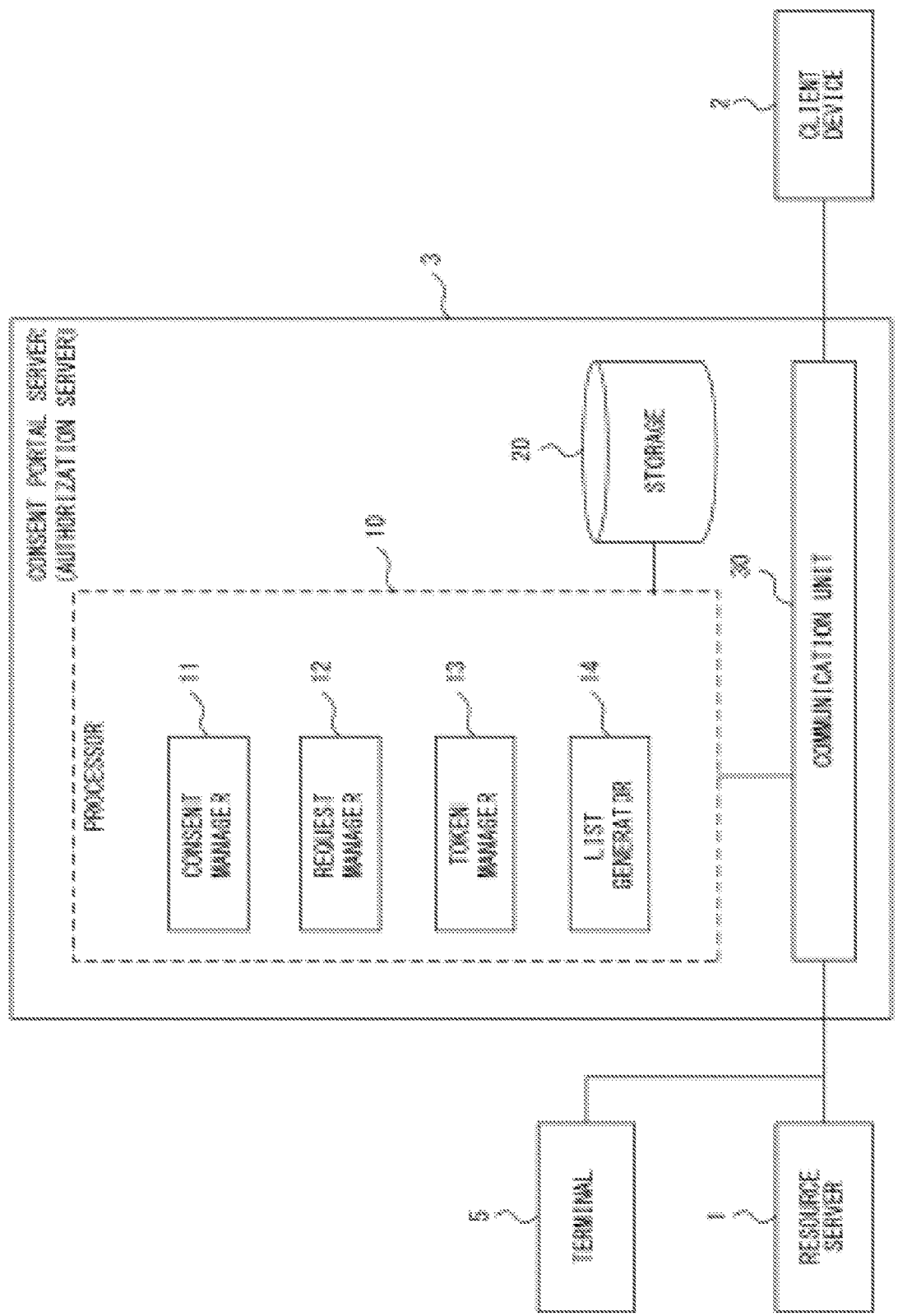
FIG. 6 illustrates an example of the configuration of a consent portal server.

FIG. 6 illustrates an example of the configuration of the consent portal server 3. As depicted in FIG. 6, the consent portal server 3 includes a processor 10, a storage 20, and a communication unit 30. Note that the consent portal server 3 may include other functions or devices that are not depicted in FIG. 6.

The processor 10 provides the functions of the consent portal server 3 by executing a communication program stored in a storage device (not illustrated). In particular, the processor 10 provides at least the functions of a consent manager 11, a request manager 12, a token manager 13, and a list generator 14, which are described hereinafter, by executing a communication program stored in a storage device (not illustrated). The communication program may be stored in the storage 20.

The storage 20 stores data and/or information to be used by the consent portal server 3. Specifically, the storage 20 stores at least a resource management table, a data-owner management table, and a request management table.

As depicted in FIG. 7A, resources for which the consent portal server 3 serves as an intermediary are registered in the resource management table. In particular, a data provider, a data name, and a data item are recorded for each of the resources. For example, the resource management table may be generated according to a contract between a data provider (health center in FIG. 2) and an intermediary (intermediary service company in FIG. 2).

As depicted in FIG. 7B, attribute information (e.g., name, address, sex, date of birth), a pseudonym ID, a resource ID, policy information, consent information, and the like are recorded for each data owner in the data-owner management table. A pseudonym ID is identification information for representing a data owner without specifying this data owner. In this example, "YAMADA xx" is represented by "2134", and "SUZUKI yy" is represented by "2135". Pseudonym IDs are preferably shared between the resource server 1 and the consent portal server 3. Resource IDs indicate resources that include personal data provided by data owners. In this example, health data of "YAMADA xx" is included in a resource R_2134 stored in the health center. Policy information indicates a policy pertaining to providing data that is defined by a data owner. For example, when a data owner does not wish to provide weight data, this information is recorded as policy information. Consent information indicates whether a data owner has given consent for providing personal data to a third party.

As depicted in FIG. 7C, data requests transmitted from the client device 2 are registered in the request management table. A source indicates the source of a data request. Request details designate data requested by a data user. Details of Request may be indicated using URIs. Details of Request also indicate whether the request quality information is needed. In addition, when tokens (a Q-token and an A-token) are issued for a data request, the issued tokens are stored in association with the data request.

The communication unit 30 includes a transmitter and a receiver and provides an interface for connection to a network.

When the intermediary service company and a data owner make a contract, the consent manager 11 transmits an input form pertaining to the contract to a user terminal 5a. Then, the consent manager 11 records information input using the input form in the data-owner management table.

The request manager 12 processes a data request transmitted from the client device 2. In particular, upon receipt of a data request transmitted from the client device 2 via the resource server 1, the request manager 12 registers the data request in the request management table. The request manager 12 also issues a ticket for access to the consent portal server 3 for the received data request. The ticket is transmitted to the resource server 1. In addition, upon receipt of the ticket from the source of the data request, the request manager 12 decides whether the ticket has been authorized.

When the ticket received from the source of the data request has been authorized, the token manager 13 issues a Q-token and an A-token for the data request. For example, the Q-token and the A-token may each be a random number (or pseudo random number) generated using a random number generator. Alternatively, the Q-token and the A-token may each be generated according to a specified calculation formula. The issued tokens are recorded in the request management table in association with the data request. The token manager 13 decides whether the token received from the resource server 1 (Q-token or A-token) is valid. In this case, it is decided that the received token is valid when this token is recorded in the request management table.

The list generator 14 generates a data owner list. For example, the list generator 14 may generate a data owner list when the consent portal server 3 has received a ticket from the client device 2. Alternatively, the list generator 14 may generate a data owner list when the consent portal server 3 has received a data request or when the consent portal server 3 has received a Q-token.

A data owner list is generated according to details of a data request. In the example depicted in FIG. 7C, a data owner list is generated according to the details of a data request "RQ_001". In this case, the list generator 14 searches the data-owner management table for data owners who have consented to providing personal data pertaining to the data items designated by the data request (weight, blood pressure, and the step count in this example) and corresponding to the attributes designated by the data request (age and sex in this example). The list generator 14 generates a data owner list by extracting, from the data-owner management table, identification information (pseudonym IDs in this example) of data owners who satisfy the conditions. The generated data owner list is transmitted to the resource server 1.

Figure 8:
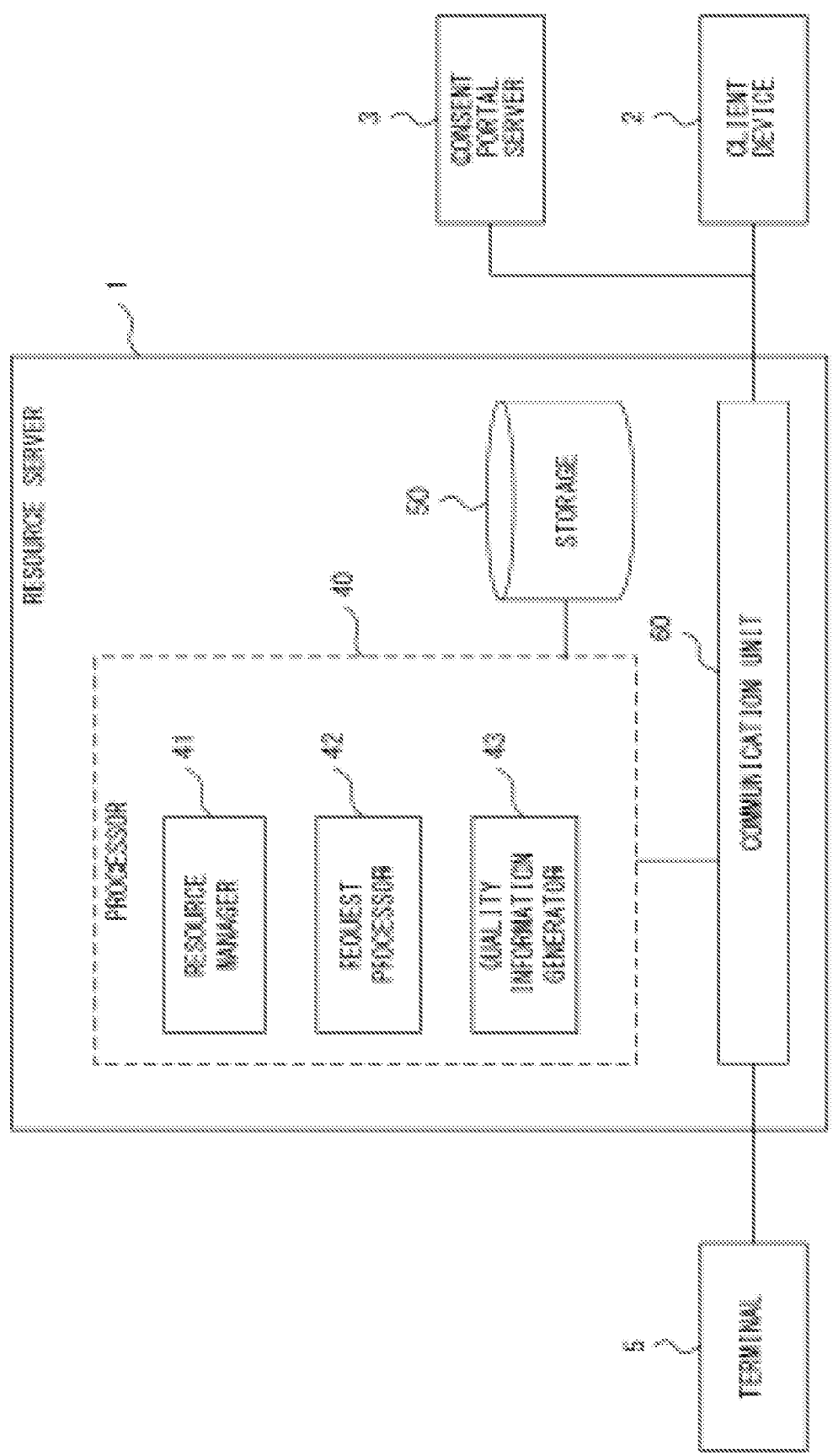
FIG. 8 illustrates an example of the configuration of a resource server.

FIG. 8 illustrates an example of the configuration of the resource server 1. As depicted in FIG. 8, the resource server 1 includes a processor 40, a storage 50, and a communication unit 60. Note that the resource server 1 may include other functions or devices that are not depicted in FIG. 8.

The processor 40 provides the functions of the resource server 1 by executing a communication program stored in a storage device (not illustrated). In particular, the processor 40 provides at least the functions of a resource manager 41, a request processor 42, and a quality information generator 43, which are described hereinafter, by executing a communication program stored in a storage device (not illustrated). The communication program may be stored in the storage 50.

Figure 9:
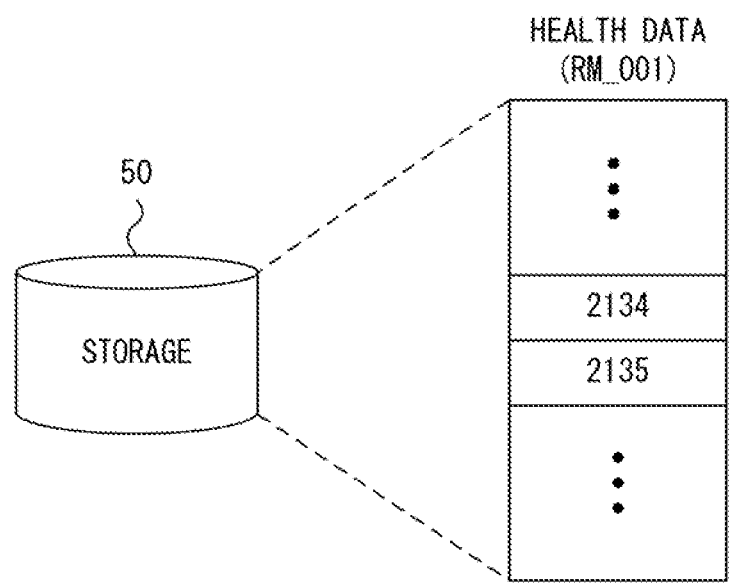
FIG. 9 illustrates an example of the configuration of data stored in a resource server.

The storage 50 stores personal data provided by a data owner. In the example depicted in FIG. 9, the storage 50 in the resource server 1 stores a resource (i.e., health data) identified as "RM_001". Note that data owners are identified by pseudonym IDs in the storage 50. In this case, the pseudonym IDs are preferably shared between the resource server 1 and the consent portal server 3.

The communication unit 60 includes a transmitter and a receiver and provides an interface for connection to a network.

The resource manager 41 stores personal data provided by a data owner in the storage 50. In this case, the personal data of the data owner is transmitted from a user terminal 5a and received by the communication unit 60. The resource manager 41 assigns a pseudonym ID to the data owner who provided the personal data. When the data owner contracts with the intermediary service company, the resource manager 41 may report the pseudonym ID assigned to the data owner to the consent portal server 3 as necessary or in response to a request from the consent portal server 3.

The request processor 42 processes a data request transmitted from the client device 2. In particular, the request processor 42 forwards a received data request to the consent portal server 3. The request processor 42 forwards a ticket received from the consent portal server 3 to the client device 2. The request processor 42 processes a token received from the client device 2. When an A-token received from the client device 2 is valid, the request processor 42 transmits health data of data owners registered in a data owner list received from the consent portal server 3 to the client device 2.

When a Q-token received from the client device 2 is valid, the quality information generator 43 generates quality information for personal data of data owners registered in a data owner list. In this example, the quality information of personal data indicates currentness, completeness, accuracy, consistency, credibility, data volume, and/or dispersibility.

Next, processes performed by the consent portal server 3 are described by referring to the flowcharts depicted in FIGS. 10A, 10B, 11, 12A, and 12B. The consent portal server 3 performs a process that corresponds to a message received from the user terminal 5, the resource server 1, or the client device 2.

Figure 10B:
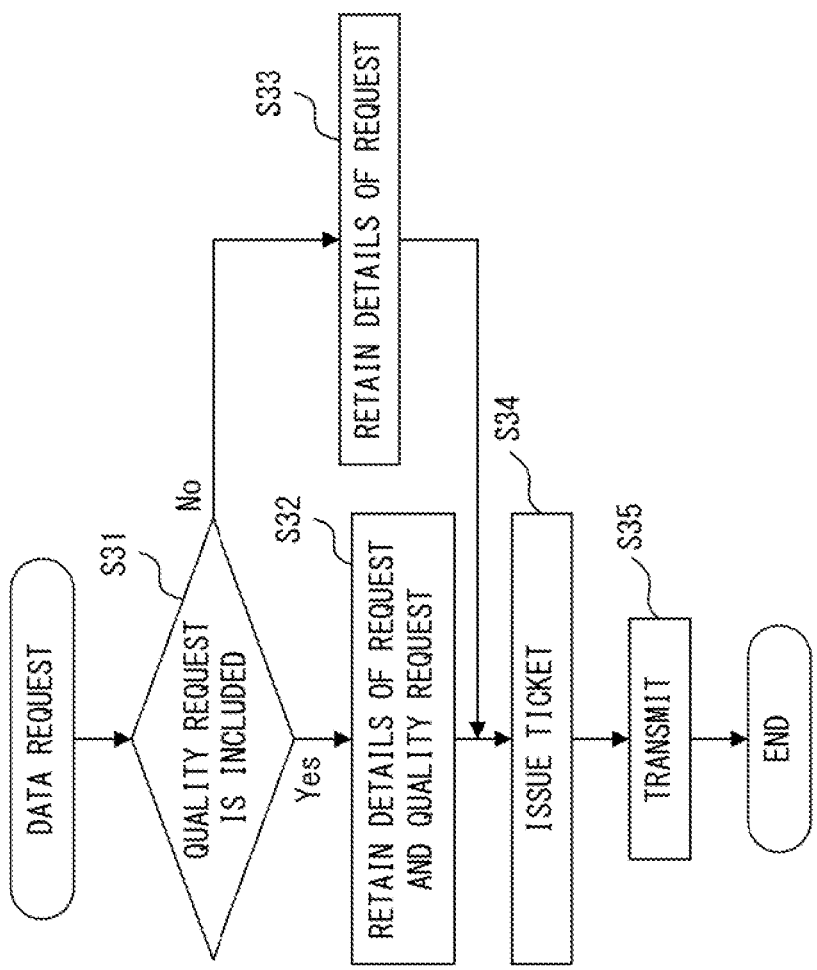
Figure 10A:
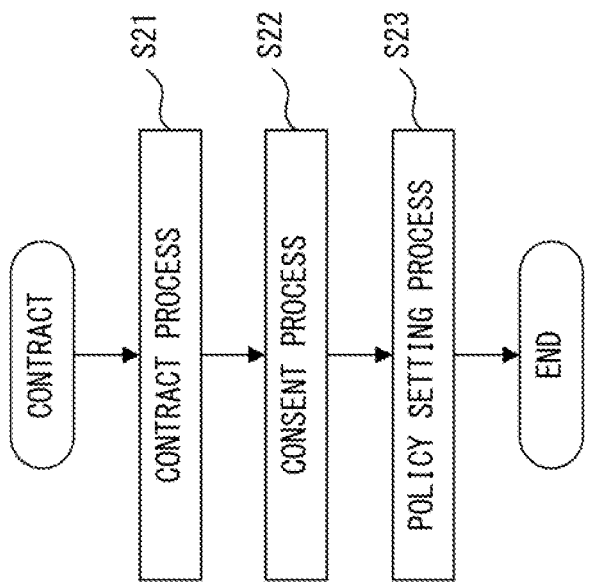

The processes of the flowchart depicted in FIG. 10A are performed when the consent portal server 3 has received a message pertaining to a contract from a user terminal 5a. These processes are performed mainly by the consent manager 11.

In S21, the consent portal server 3 transmits an input form for inputting contract information to the user terminal 5a. The consent portal server 3 stores information input using the input form in the storage 20. Note that attribute information of the data owner may be recorded in the data-owner management table.

In S22, the consent portal server 3 performs a consent process. For example, the data owner may be inquired with about whether to consent to providing personal data to a third party. When a reply to the query is transmitted from the user terminal 5a, the consent portal server 3 records the details of the reply in the data-owner management table.

In S23, the consent portal server 3 records a policy of the data owner in the data-owner management table. The data owner transmits, as necessary, a policy pertaining to providing personal data to the consent portal server 3 by using the user terminal 5a.

The processes of the flowchart depicted in FIG. 10B are performed when the consent portal server 3 has received a data request transmitted from the client device 2 via the resource server 1. In the example depicted in FIG. 5, the data request is transmitted from the client device 2 in S1 and forwarded to the consent portal server 3 by the resource server 1 in S2. These processes are performed mainly by the request manager 32.

In S31, the consent portal server 3 decides whether the received data request includes a quality request. When the data request includes a quality request, the consent portal server 3 retains the details of the data request and the quality request in S32. When the data request does not include a quality request, the consent portal server 3 retains the details of the data request in S33. In S34, the consent portal server 3 issues a ticket for allowing for access to the consent portal server 3. In S35, the consent portal server 3 transmits the issued ticket to the resource server 1.

Figure 11:
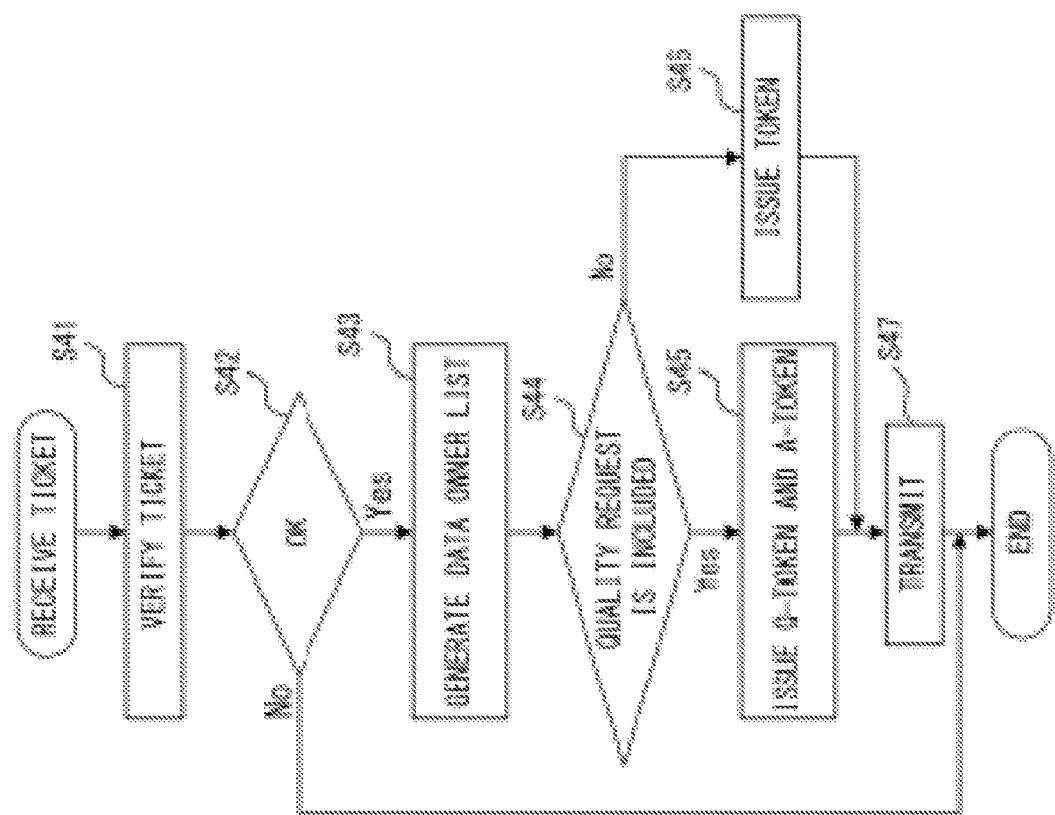

The processes of the flowchart depicted in FIG. 11 are performed when the consent portal server 3 has received a ticket transmitted from the client device 2. In the example depicted in FIG. 5, the ticket is transmitted from the client device 2 in S5. These processes are performed mainly by the request manager 12, the token manager 13, and the list generator 14.

In S41-S42, the consent portal server 3 verifies the ticket received from the client device 2. For example, when the ticket received from the client device 2 matches the ticket issued in S34, it may be decided that the received ticket has been authorized. When the received ticket has been authorized, the process of the consent portal server 3 shifts to S43.

In S43, the consent portal server 3 generates a data owner list. In particular, the consent portal server 3 provides personal data corresponding to the attributes designated by the data request registered in the request management table and designated by the data request and extracts, from the data-owner management table, the pseudonym IDs of the data owners who have consented to providing the personal data to the third party. In the example depicted in FIG. 7B, "2134", "2135", . . . are extracted from the data-owner management table. In this way, the data owner list is generated.

In S44, the consent portal server 3 decides whether the received data request includes a quality request. When the data request includes a quality request, the consent portal server 3 issues a Q-token and an A-token in S45. For example, the Q-token and the A-token may each be a random number (or pseudo random number) generated by using a random number generator. Alternatively, the Q-token and the A-token may each be generated according to a specified calculation formula. The consent portal server 3 records the generated Q-token and A-token in the request management table in association with the data request transmitted from the client device 2.

When the data request does not include a quality request, the consent portal server 3 issues one token in S46. The token issued in S46 corresponds to the token used in the sequence depicted in FIG. 4.

In S47, the consent portal server 3 transmits the token(s) issued in S45 or S46 to the client device 2.

The processes of the flowchart depicted in FIG. 12A are performed when the consent portal server 3 has received a Q-token transmitted from the resource server 1. In the example depicted in FIG. 5, a Q-token is transmitted from the client device 2 in S7 and forwarded to the consent portal server 3 by the resource server 1 in S8. These processes are performed mainly by the token manager 13.

In S51-S52, the consent portal server 3 verifies the Q-token received from the resource server 1. For example, it may be decided that the Q-token received from the resource server 1 is valid when the received Q-token is registered in the request management table. When the Q-token is valid, the consent portal server 3 transmits a verification OK message and a data owner list to the resource server 1 in S53. When the Q-token is not valid, the consent portal server 3 transmits an error message to the resource server 1 in S54.

The processes of the flowchart depicted in FIG. 12B are performed when the consent portal server 3 has received an A-token transmitted from the resource server 1. In the example depicted in FIG. 5, an A-token is transmitted from the client device 2 in S11 and forwarded to the consent portal server 3 by the resource server 1 in S12. These processes are performed mainly by the token manager 13.

In S61-S62, the consent portal server 3 verifies the A-token received from the resource server 1. For example, it may be decided that the A-token received from the resource server 1 is valid when the received A-token is registered in the request management table. When the A-token is valid, the consent portal server 3 transmits a verification OK message to the resource server 1 in S63. When the A-token is not valid, the consent portal server 3 transmits an error message to the resource server 1 in S64.

Next, processes performed by the resource server 1 are described by referring to the flowcharts depicted in FIGS. 13A-13C and 14A-14C. The resource server 1 performs a process that corresponds to a message received from the client device 2 or the consent portal server 3.

Figures 13A, 13B, 13C:
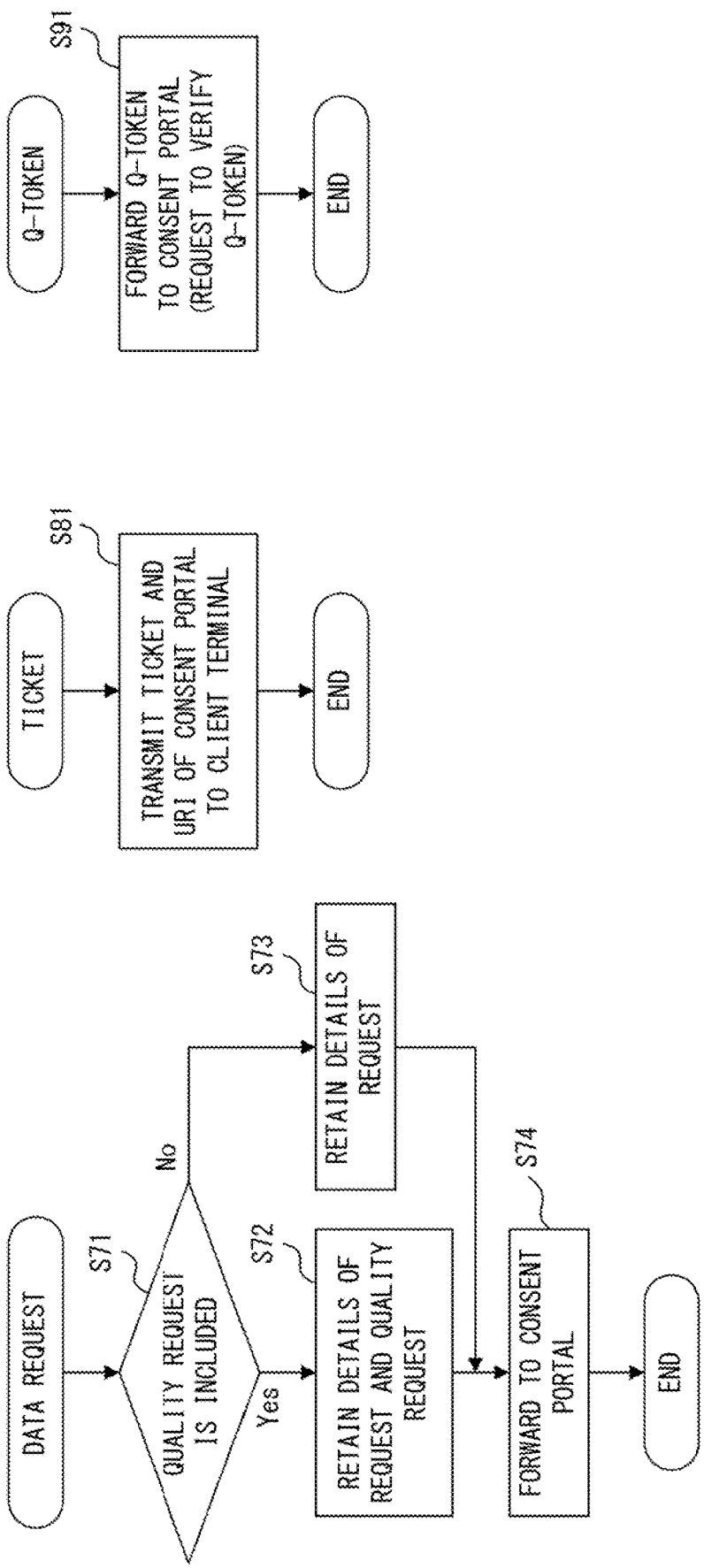

The processes of the flowchart depicted in FIG. 13A are performed when the resource server 1 has received a data request from the client device 2. In the example depicted in FIG. 5, the data request is transmitted from the client device 2 in S1. These processes are performed mainly by the request processor 42.

In S71, the resource server 2 decides whether the received data request includes a quality request. When the data request includes a quality request, the resource server 13 retains the details of the request and the quality request in S72. When the data request does not include a quality request, the resource server 1 retains the details of the request in S73. In S74, the resource server 1 forwards the data request received from the client device 2 to the consent portal server 3.

The processes of the flowchart depicted in FIG. 13B are performed when the resource server 1 has received a ticket from the consent portal server 3. In the processes depicted in FIG. 10B, a ticket is issued by the consent portal server 3 for a data request. In the example depicted in FIG. 5, a ticket is transmitted from the consent portal server 3 in S3. These processes are performed mainly by the request processor 42.

In S81, the resource server 1 forwards the received ticket to the source of the data request. In particular, the resource server 1 forwards the received ticket to the client device 2. In this case, the resource server 1 reports, to the client device 2, a URI for allowing for access to the consent portal server 3.

The processes of the flowchart depicted in FIG. 13C are performed when the resource server 1 has received a Q-token from the client device 2. In the processes depicted in FIG. 11, a Q-token is issued by the consent portal server 3 for a data request. In the example depicted in FIG. 5, a Q-token is transmitted from the consent portal server 3 in S6 and forwarded by the client device 2 to the resource server 1 in S7. These processes are performed mainly by the request processor 42.

In S91, the resource server 1 forwards the received Q-token to the consent portal server 3. In this case, the resource server 1 may make a request for the consent portal server 3 to verify whether the Q-token is valid.

The processes of the flowchart depicted in FIG. 14A are performed when the resource server 1 has received a verification result for a Q-token from the consent portal server 3. In the processes depicted in FIG. 12A, a Q-token is verified by the consent portal server 3. In the example depicted in FIG. 5, a verification result is transmitted from the consent portal server 3 to the resource server 1 in S9. These processes are performed mainly by the quality information generator 43.

In S101, the resource server 1 checks the verification result for the Q-token. In S102, the resource server 1 decides whether a data owner list is attached to the verification result for the Q-token. When the Q-token is valid and a data owner list is attached, the process of the resource server 1 shifts to S103.

In S103, the resource server 1 extracts personal data of data owners registered in the data owner list from, the storage 50. In S104, the resource server 1 generates quality information for the personal data extracted in S103. For example, the quality information may be generated in accordance with ISO25012. However, in chis example, some evaluation items are added to ISO25012. Note that examples will be described hereinafter for a method for generating quality information for personal data.

In S105, the resource server 1 transmits the quality information to the client device 2. When the Q-token is not valid or a data owner list is not attached, an error massage is output in S106.

The processes of the flowchart depicted in FIG. 14B are performed when the resource server 1 has received an A-token from the client device 2. In the processes depicted in FIG. 11, an A-token is issued by the consent portal server 3 for a data request. In the example depicted in FIG. 5, an A-token is transmitted from the consent portal server 3 in S6 and forwarded by the client device 2 to the resource server 1 in S11. These processes are performed mainly by the request processor 42.

In S111, the resource server 1 forwards the received A-token to the consent portal server 3. In this case, the resource server 1 makes a request for the consent portal server 3 to verify whether the A-token is valid.

The processes of the flowchart depicted in FIG. 14C are performed when the resource server 1 has received a verification result for an A-token from the consent portal server 3. In the processes depicted in FIG. 12B, an A-token is verified by the consent portal server 3. In the example depicted in FIG. 5, a verification result is transmitted from the consent portal server 3 to the resource server 1 in S13. These processes are performed mainly by the request processor 42.

In S121, the resource server 1 checks the verification result for the A-token. When the A-token is valid, the resource server 1 transmits, in S122, the personal data extracted in S103 to the client device 2. When the A-token is not valid, an error massage is output in S123.

First Example

In the first example, the number of samples (the number of data owners who have consented to providing health data and correspond to attributes designated by a data request) is 453. Distribution of the age ranges of the extracted data owners is such that there are 32 data owners in their teens, 20 data owners in their 20 s, . . . , and the standard deviation is 9.8. A measurement period for the health data extends from Jan. 16, 2019 to Jan. 15, 2020. The percentage of data loss is 0.9 percent. Among the health data of the data owners, a smallest number of samples is 290 days, a largest number of samples is 365 days, and a continuous loss period is 5 days.

A "data volume" is expressed by the number of samples. A "dispersibility" is expressed by the distribution of the age ranges of the extracted data owners (in this example, deviation values). A "currentness" is expressed by the measurement period for the health data. A "completeness" is expressed by the percentage of data loss, the smallest/largest number of samples, and a continuous loss period. In the first example, quality information pertaining to accuracy, consistency, or credibility is not generated.

Figure 15:
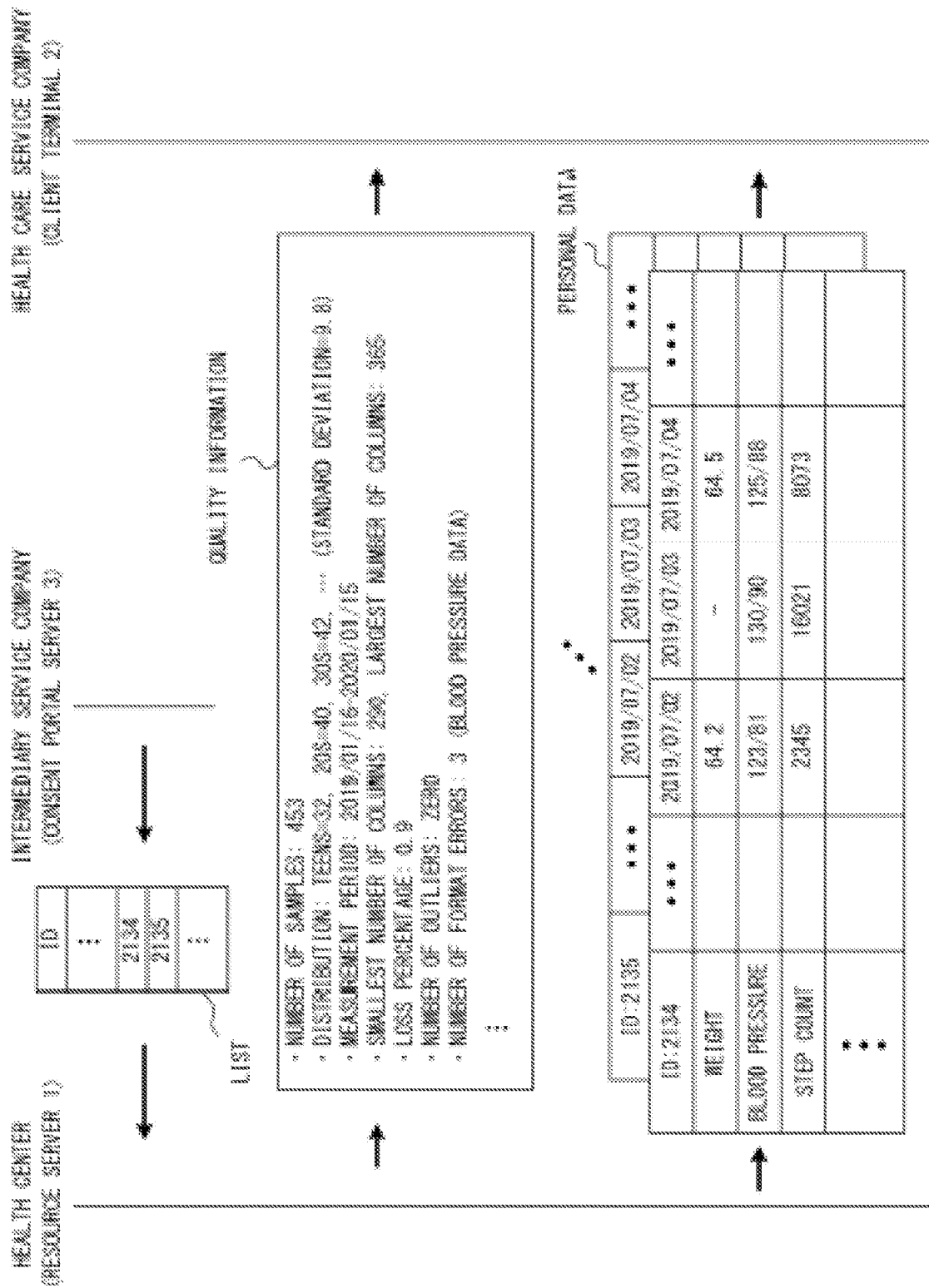
FIG. 15 illustrates a sequence of data processing in a first example.

FIG. 15 illustrates a sequence of data processing in the first example. This sequence indicates procedures after a process in which the client device 2 transmitted a data request and a Q-token and an A-token corresponding to the data request were transmitted from the consent portal server 3 to the client device 2.

Upon receipt of the Q-token transmitted from the client device 2 via the resource server 1, the consent portal server 3 transmits a data owner list to the resource server 1. Then, the resource server 1 generates and transmits quality information to the client device 2. Thus, the health care service company can determine the quality of health data before actually acquiring the health data. When the quality of the health data is satisfactory, the health care service company transmits the A-token to the resource server 1 so as to make a request for the resource server 1 to transmit the health data to the health care service company. The resource server 1 transmits the health data to the client device 2 in response to the request.

Second Example

In a second example, quality information pertaining to "accuracy" is generated additionally in comparison with the first example. In this example, the accuracy indicates the correctness of a data value or the correctness of a data format.

For example, possible data ranges of "5-180 kg", "40-180 mHg", and "1-99999 steps" may be set for weight data, blood pressure data, and step count data, respectively. In this case, for each of the weight data, the blood pressure data, and the step count data, it is decided whether a measured value falls within the data range that has been set. Then, the number of measured values that do not fall within the data range is counted. Thus, the "accuracy (correctness of a data value)" is expressed by the number of outliers.

Assume that a minimal blood pressure and a maximal blood pressure are indicated using a format in which a slash "/" is interposed between the two values. In this case, it is decided that a format error has occurred when a minimal blood pressure and a maximal blood pressure are indicated in another format, e.g., "80, 120". Alternatively, a minimal blood pressure and a maximal blood pressure may be indicated using a format in which the minimal blood pressure is indicated to the left of a slash and the maximal blood pressure is indicated to the right of the slash. In this case, it is decided that a format error has occurred when a value indicated to the right of the slash is larger than a value indicated to the left of the slash, e.g., "120/80". Thus, the "accuracy (correctness of the data format)" is expressed by the number of format errors.

Variations

In the embodiments depicted in FIGS. 5-14C, before acquiring data, the data user can determine the quality of this data by using two tokens (i.e., Q-token and A-token). However, the present invention is not limited to this method. For example, the consent portal server 3 may issue one token for one data request. The resource server 1 prepares an end point for providing data (e.g., /token/data) as well as an end point for providing quality information (e.g., /token/quality_info). In this case, for example, the two end points may be reported from the resource server 1 to the consent portal server 3, and then the two end points may be reported from the consent portal server 3 to the client device 2, instead of the process of S6 depicted in FIG. 5 being performed. Subsequently, the client device 2 acquires the quality information by accessing the end point for providing the quality information by using the token, instead of performing the process of S7 depicted in FIG. 5. The client device 2 also acquires the data by accessing the end point for providing the data by using the same token, instead of performing the process of S11 depicted in FIG. 5.

When transmitting a data request, the client device 2 may designate one or more desired items of the seven items described above (data volume, dispersibility, currentness, accuracy, completeness, consistency, and credibility). In this case, the resource server 1 transmits quality information pertaining to only the designated items to the client device 2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a communication program for causing a processor in a server device to execute a communication process, the communication process comprising:
   receiving a data request transmitted from a client device via a resource server, the data request including attribute information, a data item and a quality request;
   transmitting, to the client device, a first token for requesting quality information indicating a quality of personal data corresponding to the attribute information and the data item and a second token for requesting the personal data;
   transmitting, to the resource server, a verification, result for the first token and identification information of a data owner who has consented to providing personal data pertaining to the data item and corresponds to the attribute information when the server device receives the first token from the resource server; and
   transmitting a verification result for the second token to the resource server when the server device receives the second token from the resource server.

2. The non-transitory computer-readable recording medium according to claim 1, the communication process further comprising:
   issuing and transmitting a ticket to the resource server when the data request is received; and
   transmitting the first token and the second token to the client device when the server device receives the ticket from the client device.

3. A server device comprising:
   a receiver configured to receive a data request transmitted from a client device via a resource server, the data request including attribute information, a data item and a quality request; and
   a processor configured to
      transmit, to the client device, a first token for requesting quality information indicating a quality of personal data corresponding to the attribute information and the data item and a second token for requesting the personal data,
      transmit, to the resource server, identification information of a data owner who has consented to providing personal data pertaining to the data item and corresponds to the attribute information when the server device receives the first token from the resource server, and
      transmit a verification result for the second token to the resource server when the server device receives the second token from the resource server.

4. The server device according to claim 3, wherein the processor issues and transmits a ticket to the resource server when the data request is received, and transmits the first token and the second token to the client device when the server device receives the ticket from the client device.

5. A data processing method for providing personal data stored in a resource server to a client device, the data processing method comprising:

transmitting, by the client device, a data request to the resource server, the data request including attribute information, a data item and a quality request;

forwarding, by the resource server, the data request to an authorization server;

transmitting, by the authorization server to the client device, a first token for requesting quality information indicating a quality of personal data corresponding to the attribute information and the data item included in the data request and a second token for requesting the personal data;

transmitting, by the client device, the first token to the resource server;

forwarding, by the resource server, the first token to the authorization server;

transmitting, by the authorization server to the resource server, identification information of a data owner who has consented to providing personal data pertaining to the data item and corresponds to the attribute information when a first token received from the resource server matches the first token transmitted to the client device;

transmitting, by the resource server to the client device, quality information indicating a quality of the personal data of the data owner identified by the identification information;

transmitting, by the client device, the second token to the resource server after receiving the quality information; and transmitting, by the resource server, the personal data of the data owner identified by the identification information to the client device.

6. The data processing method according to claim 5, wherein the resource server generates quality information indicating at least one of data volume, dispersibility, currentness, accuracy, completeness, consistency, and credibility for the personal data of the data owner identified by the identification information and transmits the generated quality information to the client device.

7. The data processing method according to claim 5, wherein the quality information indicates a percentage of loss in the personal data of the data owner identified by the identification information.

8. The data processing method according to claim 5, wherein the quality information indicates a number of outliers in the personal data of the data owner identified by the identification information.

9. The data processing method according to claim 5, wherein the quality information indicates a number of format errors in the personal data of the data owner identified by the identification information.

\* \* \* \* \*